(12) United States Patent
Wu

(10) Patent No.: US 7,382,507 B2
(45) Date of Patent: Jun. 3, 2008

(54) IMAGE QUALITY DEFECT DETECTION FROM IMAGE QUALITY DATABASE

(75) Inventor: Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 811 days.

(21) Appl. No.: 10/990,839

(22) Filed: Nov. 17, 2004

(65) Prior Publication Data

US 2006/0103899 A1    May 18, 2006

(51) Int. Cl.
  *G03F 3/08* (2006.01)
(52) U.S. Cl. .................. 358/523; 358/1.9; 358/1.16; 358/1.17; 358/1.18; 358/504; 358/3.26; 399/9; 399/15; 347/19; 382/112
(58) Field of Classification Search ............. 385/1.11, 385/1.2, 1.16, 1.17, 1.18, 1.9, 523, 524, 504, 385/3.26; 382/147, 112; 399/38, 9, 15, 399/49; 347/14, 19
See application file for complete search history.

(56) References Cited

U.S. PATENT DOCUMENTS

| | | | |
|---|---|---|---|
| 6,005,670 A * | 12/1999 | Coleman | .................. 358/1.9 |
| 6,185,385 B1 | 2/2001 | Mestha et al. | |
| 6,192,149 B1 | 2/2001 | Eschbach et al. | |
| 6,434,264 B1 * | 8/2002 | Asar | ......................... 382/147 |
| 6,598,953 B2 * | 7/2003 | Bland | ........................... 347/19 |
| 6,665,425 B1 | 12/2003 | Sampath et al. | |
| 6,728,004 B2 | 4/2004 | Loce et al. | |
| 6,862,414 B2 * | 3/2005 | Sampath et al. | ............... 399/15 |
| 7,058,325 B2 * | 6/2006 | Hamby et al. | ................. 399/49 |
| 7,120,369 B2 * | 10/2006 | Hamby et al. | ................. 399/49 |
| 2002/0141769 A1 * | 10/2002 | Phillips | ........................ 399/38 |
| 2002/0171697 A1 * | 11/2002 | Gargir et al. | .................. 347/14 |
| 2003/0084065 A1 | 5/2003 | Lin et al. | |
| 2003/0142985 A1 * | 7/2003 | Sampath et al. | ................ 399/9 |
| 2005/0286742 A1 * | 12/2005 | Rasmussen et al. | ......... 382/112 |
| 2006/0071963 A1 * | 4/2006 | Sampath et al. | ............... 347/19 |
| 2008/0030790 A1 * | 2/2008 | Plotkin et al. | .............. 358/3.26 |

* cited by examiner

*Primary Examiner*—Twyler L. Haskins
*Assistant Examiner*—Nicholas C Pachol
(74) *Attorney, Agent, or Firm*—Maginot, Moore & Beck

(57) ABSTRACT

A method of detecting image quality defects in the output of an image output device includes the steps of generating a test pattern at a known time, analyzing the test pattern to generate image quality defect records, storing the image quality defect records in memory linked to a time stamp indicating known time when the test pattern was generated, repeating the generating, analyzing and storing steps at a plurality of different known times to generate a database of time stamped image quality defect records, reconstructing isolated defect data from each of a plurality of image quality defect records in the database, constructing cumulative defect data by probabilistic summation of the isolated defect data and analyzing the cumulative defect data using an image quality assessment/analysis engine.

20 Claims, 10 Drawing Sheets

IMAGE QUALITY DEFECT DETECTION FROM IMAGE QUALITY DATABASE

BACKGROUND AND SUMMARY

This invention relates to imaging devices and more particularly to imaging devices that automatically implement statistical quality control.

Image output devices (IOTs) have known limitations on their capability to generate images. While image defects may exist in every image generated by an IOT, so long as the defects are such that they are within the limitations on the capability of the IOT, no service or correction is required. However, when the defects in the image generated by the IOT are such that the IOT has the capability to generate higher quality images, corrective measures should be taken. In order to determine whether the images generated by an IOT are within the tolerances of the output of the IOT, it is common practice to occasionally print test pattern pages. Commercial print operations often use statistical quality control (SQC) of their printed products to be able to guarantee to their customers the quality of the prints. These test pattern pages are analyzed either by operators or service technicians or automatically using image processing algorithms to generate image quality data. This image quality data is compared to the tolerances for the output of the IOT to determine whether service or other corrective measures are required. It is preferable that corrective measures be taken as soon as the image quality falls outside the tolerances that the IOT can generally be expected to meet.

The process of making measurements from the test pattern images is to a certain extent subjective and therefore can be prone to generation of erroneous image data. It is undesirable to request a service call or take other corrective measures based upon defective image quality data. A common practice for detecting banding and streaking defects is to compute the 1D amplitude spectrum of test prints, analyze them, and then conclude whether banding or streaking is a problem and the characteristics of the problem. Prior art practices were to perform the image quality analysis based on a test print, or multiple test prints to determine the current state of the image quality of the IOT. Some systems including IOTs have the capability of storing image quality data in a database relating the image quality data to the time at which it was analyzed. One such system is the six sigma image quality system. With the advent of six-sigma image quality (SSIQ) system and other similar systems in which image quality data is stored in a time stamped manner, it becomes possible to track the image quality performance over time using the image quality database, IQDB. Such tracking can even be automated.

One type of prior art SSIQ system is shown in FIG. 10. Such prior art SSIQ systems 100 include a printer system 102 having a controller (DFE) 104 and an IOT 106. For submission of regular print jobs ("customer jobs"), digital data are sent from a regular print job submission generator 108 to the printer system 102. In FIG. 10, the printer system 102 is assumed to be a printer, however, it is within the scope of the disclosure for the printer system 102 to be a copier. Regular print jobs result in hardcopy output 110 for the customer.

A module 112 is responsible for generating the data resulting in hardcopy test patterns which can be analyzed for SQC purposes. Conceptually, this function is different from traditional controller 104 functionality, but with certain SSIQ physical architectures, this module 112 may be integrated with the controller 104. When the printer system 102 is a copier, this module 112 is the scanning system that generates data for generating a copy based on a test pattern being disposed on the scanner bed. The basic function of this module 112 is to submit the desired test pattern for printing on the desired IOT 106, specifying the desired substrate and other conditions, at the desired time. To assess the banding defects of an IOT 106, a common practice is to print appropriate test patterns such as uniform full-page halftone images, and then measure the print quality by extracting a 1D profile.

An example of such a pattern is a uniform grey image at 50% CMY. Another example is a test pattern with three uniform segments, white, 40% grey, and 70% grey. Depending on the set of failures the system is designed to diagnose, the customer will be directed to print one or more copies of the test pattern if the IOT 106 is a printer or make one or more copies of the test pattern if the IOT 106 is a copier. If the IOT 106 is a copier, the user will also be given additional directions regarding where the original test pattern needs to be placed, e.g. in the document feeder or on the platen glass, and whether to enlarge/reduce the image when making copies.

The SSIQ system 100 may also collect all the meta-data corresponding to the test pattern that is about to be submitted for printing. The meta-data covers all data that is necessary for the subsequent print quality analysis, as well as all the available data that is deemed to be relevant for the subsequent SQC analysis. Such data may include IOT identification, time, date, position relative to print jobs, IOT machine parameters, environmental parameters (temperature, humidity), substrate type, halftone type and other imaging parameters and instructions for the Print Quality Analysis system 114 regarding test pattern content and desired analysis.

The SSIQ may also create an identification (PSN), which is unique for the page that will be printed (e.g., a print serial number) and store the meta-data linked with the PSN, in a manner such that it can be retrieved later on by both the Print Quality Analysis system 114 and for SQC diagnostic engine 116. For example, the PSN and corresponding meta-data can be stored in a record in a database 118. The test pattern submitted by the test sample generation module 112 results in a single page hardcopy output 120 containing the PSN in some form, e.g. as barcode. Corresponding to the hardcopy output page 120, meta-data and PSN has been stored, for example in a database 118.

The hardcopies of the test samples 120 are moved by an operator from the printer output tray to the Print Quality Analysis system 114. Typically, once the copies of the test pattern are made if the IOT is a copier or test patterns are printed if the IOT is a printer, the operator scans the test patterns 120 either using an external scanner or the scanner on their copier. If the set of failures does not include any defects related to the scanner system of a copier, then test patterns stored internally in the machine or on a server may be printed, as opposed to scanning hard copy test patterns and the scanner on the copier may be used for scanning the printed test images instead of an external scanner.

As mentioned above, typically, the Print Quality Analysis system 114 involves a flatbed scanner with automatic document feeder (ADF). The Print Quality Analysis system 114 may be responsible for automatically decoding the PSN if one is present and retrieving information based on the PSN from the database 118. The Print Quality Analysis system 114 can retrieve information that is necessary to perform an accurate analysis, for example substrate information. Optionally, it can retrieve information about the test pattern content and which specific analyses should be performed.

The scanned images are then analyzed by the Print Quality Analysis system 114 to characterize the banding or streaking defects in terms of quantitative parameters by evaluation of the banding metric or streaking metric. Detection of banding and streaking defects is a similar process, therefore only banding detection will be described with the understanding that streaking detection is similar. Once the test images are scanned, the (one-dimensional) L* variations across the image are obtained from the scanned data. Spectral analysis is the performed on the 1D profile by applying Fourier analysis plus some additional signal processing on it to generate banding defects data. As the first step, the Fourier transform of the L* data, FFT(L*) is obtained. Next, the frequency domain data is modulated via a visual transformation function that applies the blurring and edge enhancement of the human visual system. The visually transformed data is then converted back to space domain data, denoted here, as Lf*. Finally, a visual banding metric number, denoted here, as VBL number, is evaluated by first, computing the deviation from average of the Lf* data, and next, by computing a running average of the squared data, and finally, by obtaining the square root of the running average. The image quality outputs from this analysis consist of two types of data, a raw array data of the 1D L*(a*/b*) amplitude spectrum as a function of frequency and a summarized banding defect record. The banding defect record contains a list of detectable banding defects with their corresponding characteristics. The banding defect record can always be recomputed from the raw amplitude spectrum. However, the raw amplitude spectrum cannot be recomputed from the banding defect record.

The Print Quality Analysis system 114 can then decode the information and store it for later use by the SQC diagnostic engine 116. Next, key features are extracted from the banding metric outputs. The feature extraction process abstracts the information in the banding metric outputs into a few key qualitative values, such as a banding defect record including amplitude, frequency and spread data.

The measurement results are stored for later use by the SQC diagnostic engine 116, for example by adding the results to the database 118, linked with the given PSN. The diagnostic engine 116 can retrieve and process the measurement results linked with the meta-data via the PSN. Additionally, the controller 104 can retrieve the results and provide direct feedback to the operator. The sample metadata can be encoded directly on the sample (in addition to or in place of the PSN).

The few key qualitative values extracted from the banding metric outputs, e.g. a banding defect record including amplitude, frequency and spread data, are passed from the database 118 to the SQC diagnostic engine 116 to determine the print engine failure that caused the banding defect. Once, the failures are identified, the user is provided with the appropriate repair action, which may be to replace a customer replaceable unit, to perform cleaning procedures, or to place service call.

The ability to detect and track the degree of banding defects over time is important for monitoring the print quality of the image output devices ("IOTs"). Maintaining such a record of banding defects provides crucial information about an IOT and facilitates diagnostics on the print engine. Banding defects (i.e. undesired 1D periodic variations) can be characterized by their amplitude (in L* or a* or b* etc) and frequency. Due to the size limitation/variation of the test pattern to be measured (which imposes a limitation on frequency sampling resolution) and the measurement noises in print quality assessment, capturing the variation (spread) of the accuracy of the measured frequency (such as using confident interval) helps to characterize banding defects. Thus, the characteristics of a banding defect are referred to herein as the banding defect's amplitude a, frequency f and frequency-spread σ.

Currently the IQ data generally will be processed instantaneously and used as an indication of the "banding performance" of this given IOT at that moment. However, the accuracy of such instantaneous processing heavily depends on the accuracy of the current IQ measurement and the extent to which the current prints truly reflect the current banding performance of the IOT. Incorporating the past IQ results could alleviate the dependency on the accuracy of the current banding performance measurements and provide better repeatability of the measurements. Incorporating the past IQ results reduces the error in the banding performance measurements caused by measuring some unreasonable bad prints (or good ones) to more accurately reflect the current state of the IOT. Finally, instantaneous processing of current IQ data only precludes the possibility of inferring the future state of the banding performance of the IOT.

The errors arising from the inaccuracy of a single current IQ measurement or a current print that does not truly reflect the current banding performance of the IOT could be reduced by taking more measurements (analyze more prints) at the time of interest. However, analyzing more prints at the time of interest will not change the fact that you can do a better job if you store the IQ data over time and make intelligent use of it. Additionally, it is obvious that you cannot predict the trend if you take measurement at a fixed point in time and throw it away afterward. The ability to predict future IQ data is very useful for preventing issues caused by long-term performance drifting.

As previously mentioned, SSIQ systems generate the image quality data of the IOTs and store the image quality data into a database (image quality database ("IQDB")). In many current SSIQ systems, banding defect records and/or the raw amplitude spectrum and its corresponding frequency resolution are stored. Storing all of this data can become inefficient. Using a letter-size print via short edge feed as an example, the amplitude spectrum has 6600 (11 in ×600 DPI) values at 6600 corresponding frequencies (f=i·Δf where i=0-6599). In order to capture full spectral data so that you can recover the corresponding banding defect record from it, you need to store 6601 values (6600 amplitudes and one the frequency resolution Δf) per print in the IQDB. If you store the banding record instead, it requires only 3 values (a, f, σ) per detected banding defect. Depending on how many banding defects that you detected on the given print, the storage required for keeping the record varies. But the number of banding defects detected per print are generally much smaller than 2200 (6600/3). Hence from efficiency point of view, storing banding records in IQDB is certainly much better.

The benefits of storing only defect records are that less storage space is required and there is no need to re-compute the banding record from raw amplitude spectrum. The disadvantage is that the full amplitude spectrum cannot be recovered from its banding record. A challenge is presented when banding records available in the IQDB are combined for assessing/predicting the banding performance of the IOTs later.

The above referenced challenge can be illustrated with reference to two existing banding records in IQDB having the following values: Record #1: one banding defect with (a, f, σ)=(1.0, 1.0, 0.5) and Record #2: one banding defect with (a, f, σ)=(1.0, 1.1, 0.5). The two records may be processed by treating bands with f=1.0 in #1 and f=1.1 in #2 as two different bands. Alternatively, the two records may be processed by taking the average of these records across time and concluding that there are two banding defects presented, one with (a, f, σ)=(0.5, 1.0, 0.5), 0.5 in amplitude due to the averaging across time, and the other with (a, f, σ)=(0.5, 1.1, 0.5). As an additional alternative, the two records may be processed by setting a tolerance (say 0.1) on the measured frequency so that the bands in both records are considered a single band, then inferring that the frequency should be roughly equal to the average of the two records in frequency so that these two records represent a banding defect with (a, f, σ)=(1.0, 1.05, 0.5). Here the amplitude remains a=1.0 after the averaging, frequency changes to f=1.05 which is the average of the 2 records, and the frequency-spread is assumed unchanged. As the above example illustrates, without a well-thought strategy, combining results across banding records could do harms rather than good. If on the other hand the full spectral data were available in IQDB, combining the results would have been more straightforward.

Because systems including IOTs do not include unlimited memory, it would be preferable to store image quality data efficiently. In the case of banding defects, for analysis and prediction purposes it is more important to capture all the detectable bandings over time rather than the entire 1D amplitude spectrum. Obviously, if the IQDB stores all the array data of full spectrum over time, the detectable banding defects can be re-computed when needed. This is certainly not efficient since the amount of data required to capture all detectable banding defects are much smaller than that of the raw spectral data.

Even if the storage is not an issue, there is still the issue of how to combine the spectral data over time. If the IQDB stores only the summarized banding defect records for efficiency and storage reasons, combining these records over time becomes even more of a challenge than that described above with regard to Record #1 and Record #2. A method of combining such records over time would be appreciated.

The disclosed device and method efficiently stores image quality data over time in a manner facilitating the utilization of the data to schedule servicing and/or to confirm the accuracy of the most recently acquired image quality data. An image quality defect detection algorithm, which utilizes the historical data from image quality database (IQDB) about the IOTs is disclosed that permits predictions to made about future image quality. The disclosed device and method are particularly useful for customers who track the image quality of their IOTs via database such as utilizing a six-sigma image quality system. This algorithm first reconstructs isolated amplitude spectrum from each image quality defect record in IQDB. It then combines these spectra into one cumulated spectrum via probability summation. After that, a prediction term is added to this cumulated spectrum to account for the missing data between now and the last available data in the IQDB. The disclosed device and method keep the advantages of storing only the defect records in IQDB. The disclosed device and method combine image quality defect records by applying probability summation.

The disclosed algorithm advantageously provides prediction capability and improves measurement robustness by incorporating the outcome from historical data. The disclosure also provides an efficient implementation of the algorithm by utilizing a recursive function. This algorithm also provides the flexibility for users to investigate short-term and long-term IQ trend with a simple change of probability summation parameter and/or prediction scaling factor.

According to one aspect of the disclosure, a method of detecting banding defects in the output of an image output device comprising the steps of generating a test pattern, analyzing the generated test pattern, storing spectral banding defect records, repeating the generating, analyzing and storing steps, reconstructing an isolated spectrum, constructing a cumulative spectrum and analyzing the cumulative spectrum. The generating a test pattern step is performed at a known time. The analyzing the generated test pattern step includes generating spectral banding defect records including the one dimensional amplitude, frequency and spread of each detected banding defect in the test pattern. The spectral banding defect records are stored in memory linked to a time stamp indicating the known time when the test pattern was generated. The repeating the generating, analyzing and storing steps is performed at a plurality of different known times to generate a database of time stamped spectral banding defect records. The reconstructing an isolated spectrum step is performed on each spectral banding defect record in the database. The constructing a cumulative spectrum step is performed by probabilistic summation of the isolated spectra. The analyzing the cumulative spectrum step utilizes an image quality engine.

According to another aspect of the disclosure, a method of detecting image quality defects in the output of an image output device includes the steps of generating a test pattern at a known time, analyzing the test pattern to generate image quality defect records, storing the image quality defect records in memory linked to a time stamp indicating known time when the test pattern was generated, repeating the generating, analyzing and storing steps at a plurality of different known times to generate a database of time stamped image quality defect records, reconstructing isolated defect data from each of a plurality of image quality defect records in the database, constructing cumulative defect data by probabilistic summation of the isolated defect data and analyzing the cumulative defect data using an image quality assessment/analysis engine.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

A more complete understanding of the disclosed apparatus can be obtained by reference to the accompanying drawings wherein.

Corresponding reference characters indicate corresponding parts throughout the several views. Like reference characters tend to indicate like parts throughout the several views.

DETAILED DESCRIPTION

Figure 1:
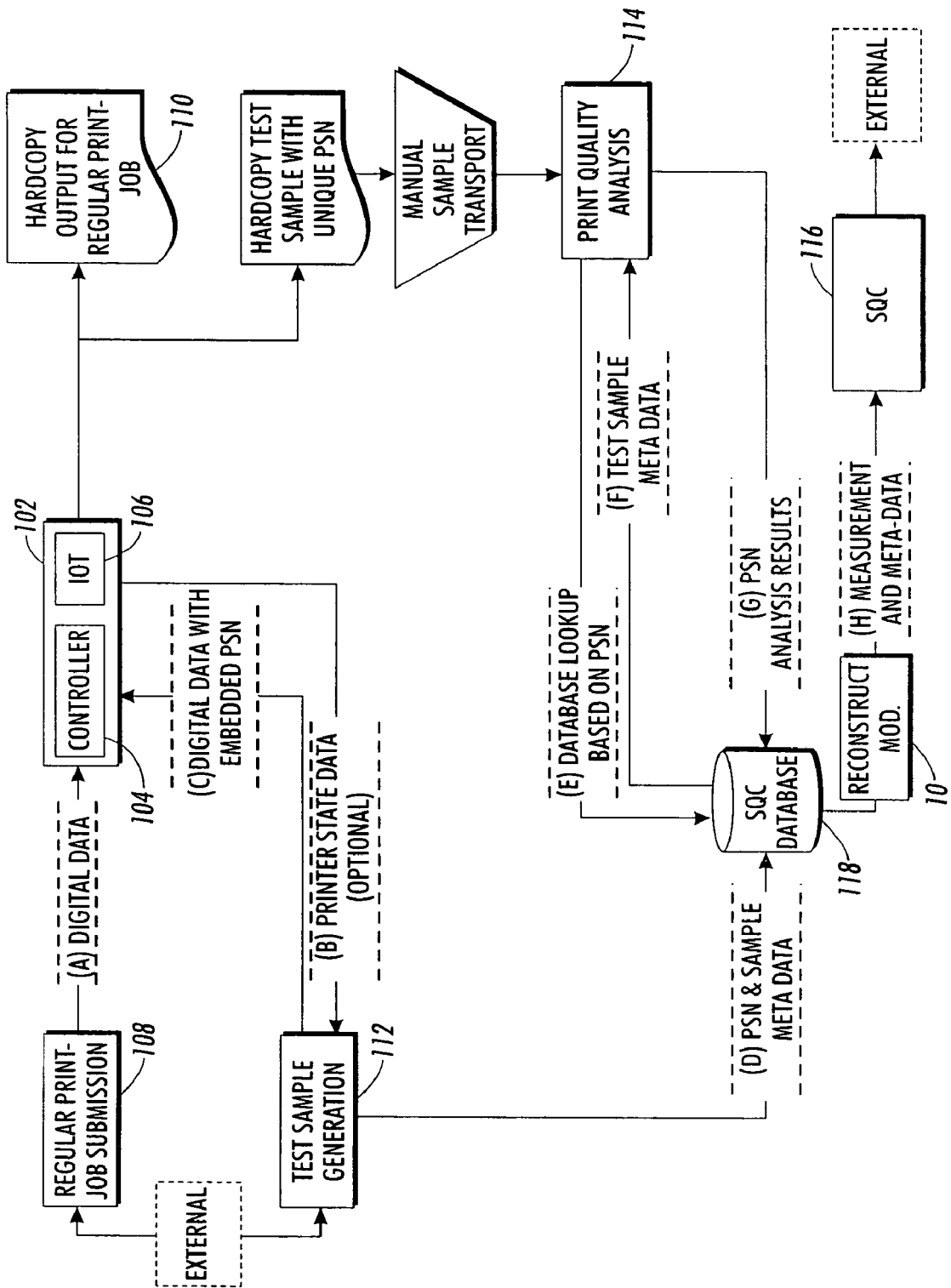
FIG. 1 is a diagrammatic view of a device for detecting banding defects in the output of an image output device including an image quality database and a module for reconstructing isolated spectra, cumulative spectra and predictive cumulative spectra to be analyzed by the image quality engine.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the invention as would normally occur to one skilled in the art to which this invention pertains.

The disclosed method of detecting banding defects may be implemented in a six sigma image quality ("SSIQ") system 100 by implementing a reconstruction module 10 that utilizes the historical data from the image quality database (IQDB) 12 stored in the database 118 about the image output devices ("IOTs") 106 and makes predictions when necessary. While the disclosed reconstruction module 10 implements a banding defect detection algorithm 14 that is particularly applicable for customers who track the image quality of their IOTs 106 via a database 12 of an SSIQ system 100, the disclosed device and method may be implemented within other image quality systems within the scope of the disclosure. Also, the same concept can be applied within the scope of the disclosure to other image quality defects, including, but not limited to a similar 1-dimensional (1-D) defects (non-periodic) called streaks.

The disclosed banding defect detection algorithm 14 first reconstructs isolated amplitude spectra 16 from all (or a subset of all) banding defect data 18 available in the IQDB 12. These reconstructed isolated amplitude spectra 16 characterize previous banding performance of the IOT 106 of interest. The disclosed banding defect detection algorithm 14 then applies a probability summation over these reconstructed isolated amplitude spectra 16 to infer a single cumulative amplitude spectrum 20 over the period of the historical image quality data utilized. A prediction term is then added to the cumulative amplitude spectrum 20 to account for the missing contribution between now and the most recent available IQ data. This cumulative spectrum with prediction term 22 is then used to characterize/predict the state of banding performance for this IOT 106. In this disclosure, an isolated amplitude spectrum 16 at $t_i$ refers to the isolated amplitude spectrum 16 reconstructed solely from the IQ data 18 at a single time point $t_i$. A cumulative amplitude spectrum 20 at $t_i$, on the other hand, refers to the cumulative amplitude spectrum 20 reconstructed from all the IQ data 18 available for $t \leq t_i$ (cumulative over the history up to $t_i$).

At the extremes, an algorithm could either use the most recent available data 18 in IQDB 12 or average over all the data 18 within a period of time to generate the single cumulative amplitude spectrum 20. These two strategies are the most common and straightforward approaches. The disclosed banding defect detection algorithm 14 is more advanced in the sense that it utilizes probability summation to cumulate past results and utilizes a prediction term for the extrapolation. The advantage of having prediction capability is obvious. The advantage of using probability summation is that the relative importance of historical data 18 can be adjusted according to IQ characteristics (short-term vs. long-term performance) of the IOT 106 of interest and/or the IOT 106 behavior (does it drift slowly or does it vary rapidly) by changing the parameters or even the functional form in the probability weighting.

For purposes of describing the disclosed banding defect detection algorithm 14, it should be assumed that in an accessible IQDB 12 there exist N sets of banding defect records 18 about an IOT 106, which were recorded at $t_i$, i=1, 2, ..., N for simplicity, it may be assumed that $t_i$'s are sorted in ascending order. The data 18 populating the IQDB 12 was obtained in the past by analyzing proper test patterns at time $t_i$ and recording the image quality (IQ) results 18 into the IQDB 12. Note that this IQ tracking (analyze proper test-pattern and store the IQ data 18 into the IQDB 12) is one of the main functionality of SSIQ system 100. Therefore, the IQ data 18 stored in the IQDB 12 is available and freely accessible to customers having a SSIQ system 100 (or another image quality system of this sort) functioning along side their IOTs 106.

Further assume that in the ith set of the above banding data 18, there exist $M_i$ banding defects. Each defect j is characterized by its amplitude $a_{ij}$, frequency $f_{ij}$, and frequency-spread $\sigma_{ij}$. Then the cumulative amplitude spectrum S(f, t) 20 which characterizes the current (time t) banding performance state of IOT 106 and/or the cumulative amplitude spectrum with prediction term T(f, t) 22, which characterizes the future banding performance state of IOT 106, can be reconstructed. First, the isolated amplitude spectrum $R(F, t_i)$ 16 at $t_i$ is reconstructed from historical data 18 in IQDB 12 (in particular, banding defect records from analyzing test patterns at $t_i$) by the following probability model:

$$R(f, t_i) = \sum_{j=1}^{M_j} a_{ij} G(f, f_{ij}, \sigma_{ij}) \quad (1)$$

Where, $G(f, f_{ij}, \sigma_{ij})$ is a pre-specific membership function 24 with parameters $f_{ij}$ and $\sigma_{ij}$. The membership function $G(f, f_{ij}, \sigma_{ij})$ 24 is very similar to a probability density function but with different multiplicative scaling. Two common choices for the membership function $G(f, f_{ij}, \sigma_{ij})$ 24 are the normal distribution function, $$G(f, f_{ij}, \sigma_{ij}) = C_p e^{-\frac{(f-f_{ij})^2}{2\sigma_{ij}^2}} \quad (2)$$

and the uniform distribution function, $$G(f, f_{ij}, \sigma_{ij}) = \begin{cases} C_p/(2\sigma_{ij}) & |f - f_{ij}| \le \sigma_{ij} \\ 0 & \text{otherwise} \end{cases} \quad (3)$$

Here, $$C_p = \frac{1}{\int_{-\infty}^{\infty}(G(f, f_{ij}, \sigma_{ij}))^2 df} \text{ or } \frac{1}{\max_f G(f, f_{ij}, \sigma_{ij})} \quad (4)$$

is a constant scaling factor used to conserve the power/energy (the former) or the maximum amplitude (the latter) of each isolated amplitude spectrum 16. Energy conservation and height preservation are common practices in spectral analysis. At this point, N sets of isolated amplitude spectra 16 have been reconstructed from data 18 in IQDB 12. Each isolated amplitude spectrum 16 could be considered to characterize the state of "banding performance" of the IOT 106 at time $t_i$. The next step is to cumulate the contribution of the isolated amplitude spectra 16 over time to get a more robust spectrum reconstruction.

The cumulative amplitude spectrum S(f, t) 20 characterizes the current (time t) banding performance state of IOT 106. The cumulative amplitude spectrum S(f, t) 20 is reconstructed by applying probability summations to the above N isolated amplitude spectra R(f, $t_i$) 16 using the following equation:

$$S(f, t) = \sum_{i=1}^{N} P(t, t_i) \cdot R(f, t_i) \quad (5)$$

where P(t, $t_i$) 26 is the probability weighting on amplitude spectrum of $t_i$. For example, if P(t, $t_N$)=1 ($t_N$ is the max of all $t_i$'s) and 0 elsewhere, then the final reconstructed cumulative amplitude spectrum 20 will be identical to the reconstructed isolated amplitude spectrum 16 solely from the most recent IQ measurement. If you set P(t, $t_i$)=constant for all $t_i$, then the final reconstructed cumulative amplitude spectrum 20 will be equal to the average of N isolated amplitude spectra 16 from the historical data 18. The reconstruction algorithm in Eq. (5) is a summation rather than a true integration. As a result, the reconstructed cumulative amplitude spectrum S(f, t) 20 is the same for all t≧$t_N$ because the equation can only cumulate the contribution up to the last available banding defect record.

The disclosed banding defect detection algorithm 14 includes a prediction term 28 for reconstructing the a predictive cumulative amplitude spectrum T(f, t) 22 on top of the reconstructed cumulative amplitude spectrum S(f, t) 20. The prediction term 28 can be estimated to account for the lack of the data 18 between t and $t_N$ by measuring the dynamics between available data ($t_1$, $t_2$, K, $t_N$) by taking the derivative on Eq. (5) with respect to t.

$$\frac{dS(f,t)}{dt} = \sum_{i=1}^{N}\left(P(t, t_i) \cdot \frac{dR(f,t)}{dt}\bigg|_{t=t_i} + R(f, t_i) \cdot \frac{dP(t, t_i)}{dt}\bigg|_{t=t_i}\right) \quad (6)$$

For the purpose of extrapolation of the predictive cumulative amplitude spectrum T(f, t) 22, it is permissible to drop the dynamics of the probability summation P(t, $t_i$) 26 and keep only the dynamics of the reconstructed isolated amplitude spectra R(f, t) 16. This simplifies the above equation to $$\frac{dS(f,t)}{dt} \approx \sum_{i=1}^{N} P(t, t_i) \cdot \frac{dR(f,t)}{dt}\bigg|_{t=t_i} \quad (7)$$

Then the final reconstructed predictive cumulative amplitude spectrum T(f, t) 22 can be calculated by substituting Eq. (7) into the following equation:

$$T(f, t) = S(f, t)\bigg|_{t=t_N} + C_S \int_{t_N}^{t} \frac{dS(f,t)}{dt} dt \quad (8)$$

In Eq. (8), $C_S$ is a constant used to scale the relative importance of the prediction term, i.e. to determine how aggressive the prediction should be. In Eq. (8), the numerical evaluation of the integral (prediction term) is not an easy task. However, many numerical tools, such as those from neural network or those from control theory (system dynamics and identifications), are available for such tasks. Alternatively, with a proper choice of the function form of the prediction function P(t, $t_i$) 26, e.g. by setting P(t, $t_i$)=$\lambda^{(t-t_i)}$, and using $1^{st}$ order approximation (linearization), the solution could become tractable and practical as discussed below.

Figure 2:
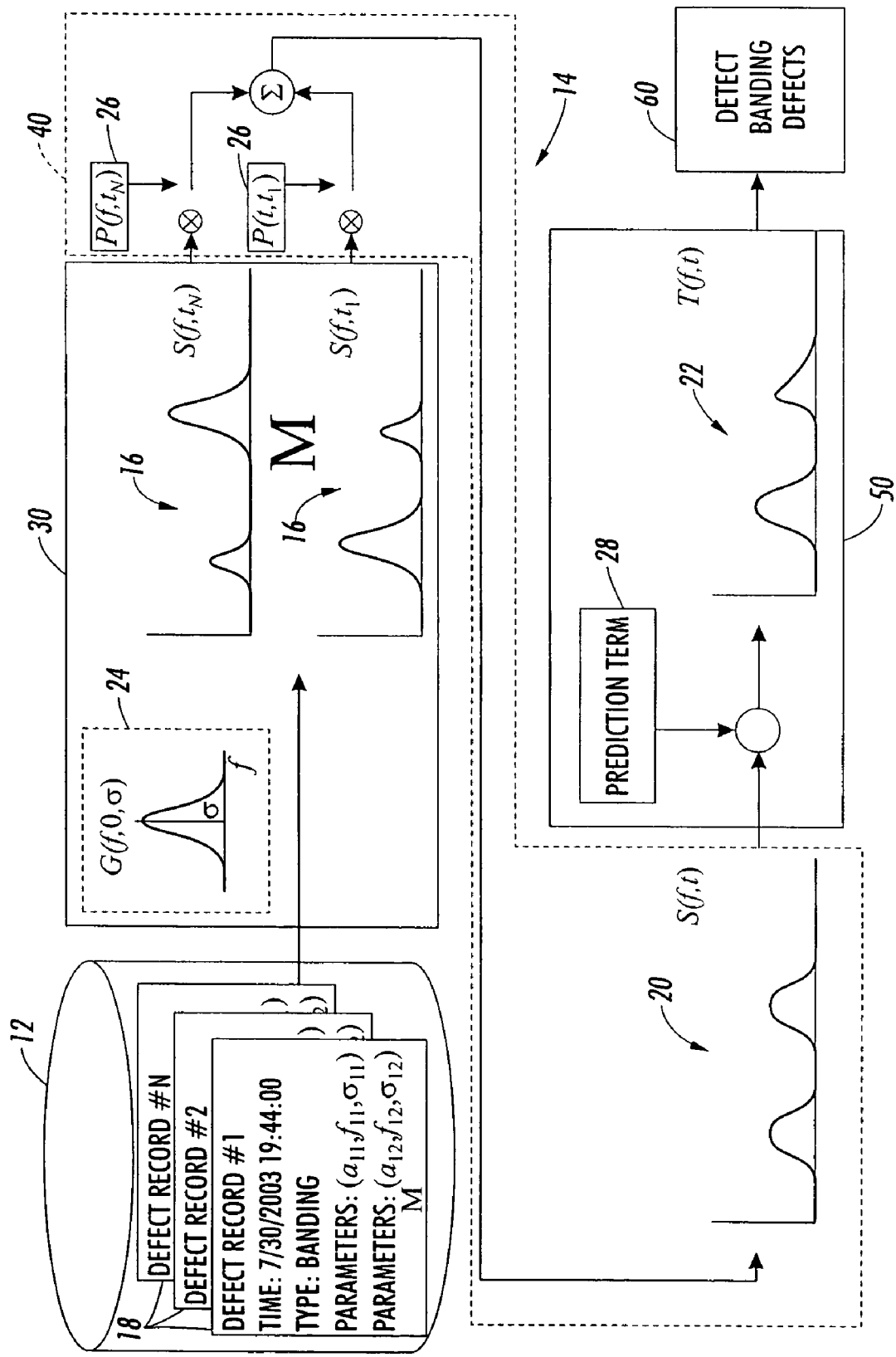
FIG. 2 is a flow diagram of the image quality database, module for reconstructing spectra and the image quality engine of FIG. 1 showing a prediction term added to the reconstructed cumulative spectra prior to analysis by the image quality engine.

As shown, for example, in FIG. 2, a banding defects detection step 60 can then be performed on the final reconstructed predictive cumulative amplitude spectrum T(f, t) 22 to predict whether IOT 106 will suffer from banding problems at a future time. Alternatively, as shown, for example, in FIG. 3, a banding defects detection step 60 can then be performed on the reconstructed cumulative amplitude spectrum S(f, t) 20 to assess whether IOT 106 is suffering from banding problems. Existing banding defect detection algorithms have been implemented in IQAF, a core IQ analysis engine 116 used widely in various systems available from Xerox.

Proper and practical selection of parameters and function forms for the above algorithm 14 facilitates implementation of the algorithm 14. The disclosed banding defect detection algorithm 14 implementation selects parameters and function forms that facilitate implementation of the algorithm 14. However, the described parameter and function form selections are not intended to limit the scope of the disclosure. It is within the scope of the disclosure for other parameters and function forms to be selected and utilized in implementing the disclosed banding defect detection algorithm 14.

It has been found that the form of the membership function 24 selected may depend on the extent of the prior knowledge of how the banding defect records 18 are extracted in the IQ print analysis engine 114. If it is not known how the IQ print analysis engine 114 extracts the banding defect records 18, the normal distribution (Eq. (2)) or uniform distribution (Eq. (3)) are good candidates for the membership function 24. If the underlying methods used by the IQ print analysis engine 114 to extract the banding defect records 18 are known, then that information should be utilized in selecting the form of the membership function 24. For an SSIQ system 100 that uses IQAF as its core IQ analysis engine, normal distribution is better than uniform distribution due to the way the IQ analysis engine finds the spectral peaks. The disclosed banding defect detection algorithm 14 is thus described as using the normal distribution as the membership function $G(f, f_0, \sigma_0)$ 24.

In the disclosed embodiment $P(t,t_i)=C\lambda^{(t-t_i)}$, $\lambda \leq 1$ is chosen as the form for the probability weighting function 26. Here $$C = \left(\sum_{i=1}^{N} \lambda^{t-t_i}\right)^{-1}$$

is served to normalize weights so that the total is one. There are some nice properties when using this form. The value of $\lambda$ determines the relative importance between recent data versus the older data. If the IOT short-term drift is to be analyzed or an IOT 106 whose characteristics change rapidly is to be analyzed, $\lambda$ can be set to a large value. Otherwise, $\lambda$ can be set to a small value. Another nice property of this functional form is that it renders the probability weighting function 26 memory-less, i.e. it exhibits the property that $P(t_1, t_2) = \text{constant} \cdot P(t, t_1) \cdot P(t_1, t_2)$. This property is referred to as memory-less since the only thing that matters is the interval in the time axis, i.e. only $t-t_2$ matters. The weighting for $t-t_2$ can be computed via any mid-point in time $t_1$. The results remain the same no matter what $t_1$ is chosen. This is in a form that resembles Markov process, thus you can show that there are efficient and recursive update methods that can be used to compute $S(f, t)$ in Eq. (5). The update equation may be summarized as:

$$S(f, t_i) = \alpha_i \cdot R(f, t_i) + (1-\alpha_i) S(f, t_{i-1}) \quad (9)$$

where, $$\alpha_i = \frac{1}{1 + \sum_{k=1}^{i-1} \lambda^{(t_i-t_k)}} \text{ and } S(f, t_0) = 0$$

This recursive update can be easily verified by the readers using a standard mathematical approach called "proof by induction".

Thus, the disclosed banding defect detection algorithm 14 is efficiently implemented in a manner that requires less memory. The disclosed banding defect detection algorithm 14 advantageously facilitates setting the relative importance between current measurement $t_i$ and the cumulative past measurement $(t_1, K, t_{i-1})$ by simply adjusting the value of $\lambda$. Since Eq. (9) is a recursive equation, adjusting $\lambda$ will change the relative importance across time and thus can control whether short-term or long-term results are extracted. The recursive aspect of Eq. 9 makes it possible to track the full amplitude spectrum in IQDB 12 by keeping the most up-to-date cumulative amplitude spectrum $S(f, t)$ 20 and re-compute or update the cumulative amplitude spectrum $S(f, t)$ 20 whenever a new defect record 18 is stored in the IQDB 12. This is very similar to the concept of running sum. The cumulative amplitude spectrum $S(f, t)$ 20 can be reset whenever a service has been performed on this IOT 106, which could bring the IOT 106 performance back to a nominal state.

Figure 3:
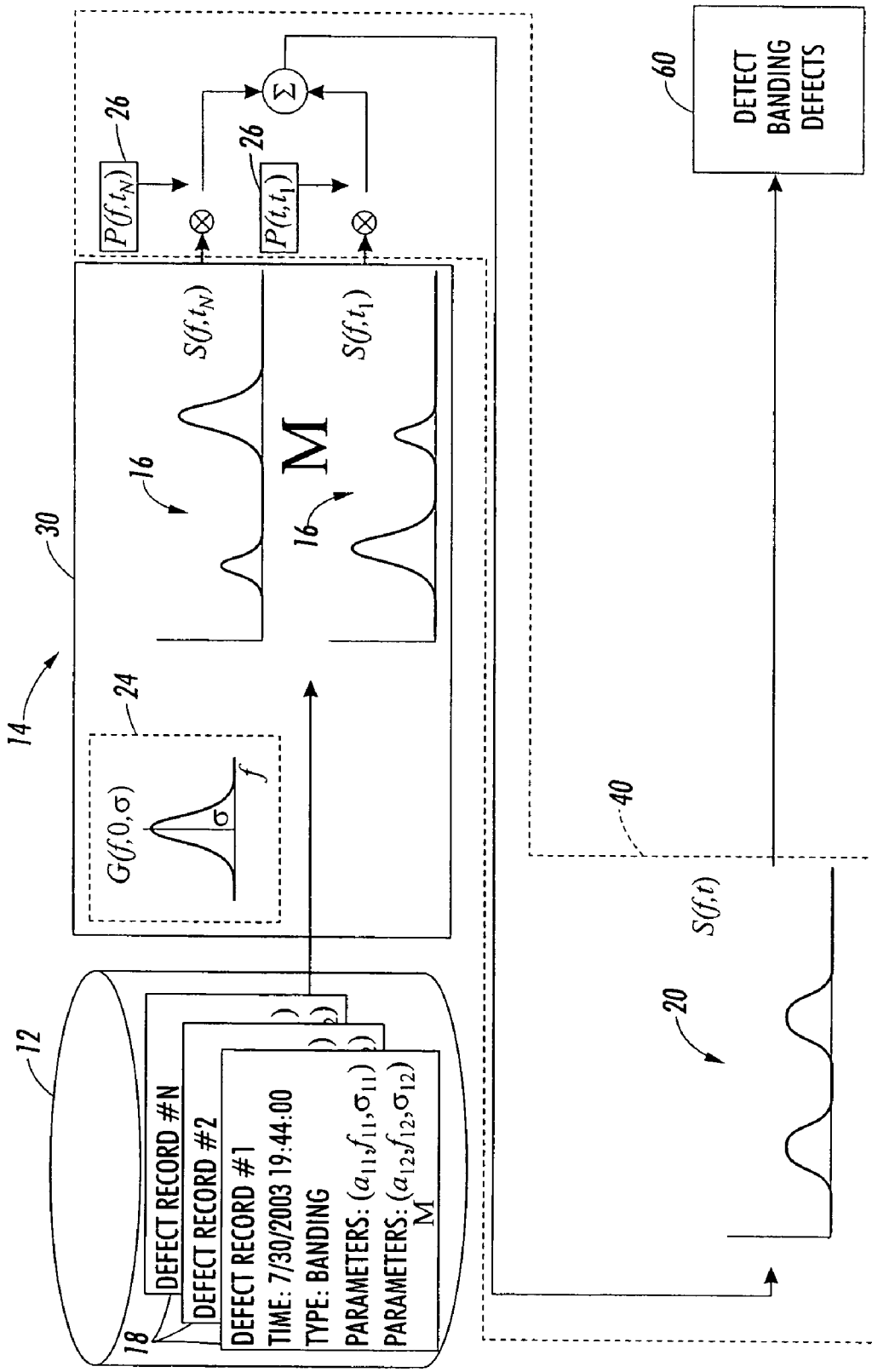
FIG. 3 is a flow diagram similar to FIG. 2 of the image quality database, module for reconstructing spectra and the image quality engine showing the reconstructed cumulative spectra being analyzed by the image quality engine without a prediction term being added.

As shown, for example, in FIG. 3, it is within the scope of the disclosure for the disclosed banding defect detection algorithm 14 to not implement prediction capabilities. When prediction capabilities are not implemented, the banding detection step 60 is performed on the cumulative amplitude spectrum $S(f, t)$ 20 without the intervening prediction of future performance step 50. For applications that prefer to implement prediction capability 50, the following equation, which is obtained by dropping all terms in Eq. (7) except for the last data point i=N and estimating the slope by the last two available data records i=N-1, N, can be utilized.

$$T(f, t) = S(f, t_N) + C_S \cdot \left(\alpha_N \lambda^{t-t_N} \cdot \frac{R(f, t_N) - R(f, t_{N-1})}{t_N - t_{N-1}} \cdot (t - t_N)\right) \quad (10)$$

The weight constant $C_S$ is adjusted to $C_S \leq 1$ to control the desired amount of prediction, i.e. how aggressive the prediction should be. If the banding defects records 18 are perfectly linear, you can be as aggressive as you want. The value of the weight constant $C_S$ should be determined by inspection of existing data 18 in IQDB 12.

Since SSIQ systems 100 already exist, many of the underlying requirements for the disclosed algorithm 14 will be known, e.g. what form of banding defect records 18 reside in the IQDB 12, what banding detection algorithm is used in IQAF 116, when a full amplitude spectrum is available, and other information related to the manner in which the image quality data was collected and stored.

A simulation of the reconstruction algorithm going from banding defect records 18 to the reconstructed cumulative amplitude spectrum $S(f, t)$ 20 and the cumulative amplitude spectrum with prediction term $T(f, t)$ 22 has been implemented in MATLAB code to demonstrate the algorithm 14. The MATLAB code used to implement the algorithm 14 in the simulations is as follows:

```
% function [T,S,R] = BandDetectionIQDB(t,lambda,BandingDefects,Cs)
%     t: time of interest in minutes from the first available record
%     lambda: scaling on relative importance of each Banding Defect records
%     BandingDefects: Banding defect records from IQDB
%     Cs: control whether prediction speed. 0 if no prediction is wanted. max is 1
%     T: reconstructed cumulated spectrum with prediction term
%     S: reconstructed cumulated spectrum without prediction term
%     R: reconstructed isolated spectra from the input BandingDefects
```

-continued

```
function [T,S,R] = BandDetectionIQDB(t,f,lambda,BandingDefects,Cs)
if nargin <4
   error('Input parameters are not valid. Try: help BandDetectionIQDB!');
end
if nargin = =4
   PredictionMode='n';
   Cs = 0;
end
% Use only historical data only
numberOfRecord = length(BandingDefects);
idx = [ ];
for i=1:numberOfRecord;
   if BandingDefects(i) .time > t;
idx=[idx i];
end
end
BandingDefects(idx) = [ ];
% Implement the lambda ^ (t-ti)
numberOfRecord = length(BandingDefects); ,
for i=1:numberOfRecord;
   ProbWeight (i) = lambda ^(t-BandingDefects(i) .time);
end
ProbWeight = Prob Weight/sum(Prob Weight);
ProbWeight = reshape (Probweight, [numberOfRecord 1]);
ProbWeight;
R = isolatedSP(f,BandingDefects);
S = R*ProbWeight;
% add prediction term
T=predictedSpectrum (S,R,Cs,lambda,t,BandingDefects);
% sub-function: reconstruction of isolate amplitude spectrum
%      f: must be a column vector for now
%      R: output that contains reconstructed isolated amplitude spectra
function R = isolatedSP (f,BandingDefects);
% Each column of R corresponds to a reconstructed isolated amplitude spectrum of
% BandingDefects.time
numberOfRecord = length(BandingDefects);
for i=1:numberOfRecord;
   R(:,i) = membership (f,BandingDefects (i) .amp,BandingDefects(i) .freq,BandingDefects(i)
.sigma); end
% sub-function: membership function for the reconstruction of spectrum from
%      single Banding defects records
%      Use normal distribution for now
%      This include both pqf and the amplitudes
function G = membership {f,a0,f0,s0);
G = 0;
numberOfBands = length(f0};
for i=1:numberOfBands
   if s0 (i) >0;
G1 = exp(-1*(f-f0(i)). .^2/(2*s0(i)*s0(i)));
   esle
G1 = zeros(size(f));
errf = abs(f-f0(i));
idx = find(errf= =min(errf)); idx=idx(l);
G1(idx) = 1;
   end
   % compute scaling factor that conserve the power
   %
   % scalingfactor = 1./sqrt(sum(G1.^2));
   scalingfactor = 1./(max(G1));
   G = G+a0(i)*G1*scalingfactor;
end
% sub-function: reconstruction of cumulated amplitude spectrum with
%      prediction
function T = predictedSpectrum(Sn,R,Cs,lambda,t,BandingDefects)
numberOfRecord = length(BandingDefects);
if numberOfRecord > 1
   for i=1:numberOfRecord;
to(i) = BandingDefects(i) .time;
end
tn = t0 (numberOf Record);
tn1 = t0 (numberOf Record-1);
Rn = R(:,numberOfRecord);
Rn1 = R(:,numberOfRecord-1);
alphaN = 1/sum(lambda.^(tn-t0))
T = Sn + Cs*(alphaN*lambda^(t-tn)*(Rn-Rn1)*(t-tn)/(tn-tn1));
else
T = Sn;
end
```

The above code is for illustration purposes only and should not be viewed as limiting the scope of the disclosure. Depending on the language that the SSIQ system 100 selected for implementing the algorithm 14 uses, the algorithm 14 can be easily converted to C/C++, Excel VBA Macro, or even a GUI in digital front end (DFE), depending on how the IQDB data will be extracted and presented to the operators.

For illustration of the algorithm 14, the following simulations have been run. The simulations were run in MAT-LAB utilizing the function implementing the algorithm 14 disclosed above and each sharing the initial code:

```
% function BDD_Simulation( )
% Program that run the simulation
%"Banding defect detection from image quality database of
%          the marking engine"
function BDD_Simulation( )
NN = 4;
NNf=10;
T_current = 50;
t=1:NN:40;
% For ID/AXXXXX simulations
[a0,f0,s0] = deal(1,0.5,0.05);
lambda = 0.9;
Cs = 1;
BandingDefectsTruth.time = 0;
BandingDefectsTruth.amp = a0;
BandingDefectsTruth.freq = f0;
BandingDefectsTruth.sigma = s0;
numberOfRecord=length(t);
% frequency of interest
f = (0:0.01:1)';
% Rand seed for simulation and its percentage noise level
seed00 = 2.0538e+005
% seed00 = sum(100*clock)
rand('seed',seed00);
alpha = 0.08; % percentage noise level
```

As can be seen from the above code, in these simulations, the current time is set to t=50. The simulated IQDB 12 has data 18 with time stamps $t_1=1, t_2=5, t_3=9, \ldots, t_{10}=37$. The IQDB 12 contains ten banding defects records 18 equally spaced in time. The value of $\lambda$ is set to 0.9 in most cases (the value is reset in various runs of simulation #4). This means the second to the last banding defect record 18 is 90% (0.9) as important as the last record 18. The prediction gain $C_S$ is set to one (very aggressive). A random noise term (±8%) is introduced in the simulations to model any noise presented in the banding defect records 18. The banding defect records 18 are different in each simulation and are described below.

In simulation #1 an IOT 106 exhibits a single banding of peak amplitude 1.0 L*, frequency 0.5 c/mm, and spread 0.05 c/mm. The code implemented to simulate these parameters and generate the plot is as follows:

```
% -------------- simulation #1
% construct banding defect records from simulated IQDB
for i=1:numberOfRecord;
    BandingDefects(i).time = t(i);
    BandingDefects(i).amp = a0*(1+alpha*(2*rand(1)-1));      %delta L* unit
    BandingDefects(i).freq = f0*(1+alpha*(2*rand(1)-1));     %c/mm
    BandingDefects(i).sigma = s0*(1+alpha*(2*rand(1)-1));    %c/mm
end
[T,S,Rs] = BandDetectionIQDB(T_current,f,1,BandingDefectsTruth);
[T,S,R] = BandDetectionIQDB(T_current,f,lambda,BandingDefects,Cs);
figure;
plot(f,R,'k:');hold
plot(f,S,'ks',f,Rs,'kv',f,T,'ko'),
title('Simulation #1');
xlabel('c/mm');
ylabel('\DeltaL*')
axis([0.2 0.8 0 1.4])
```

Figure 4:
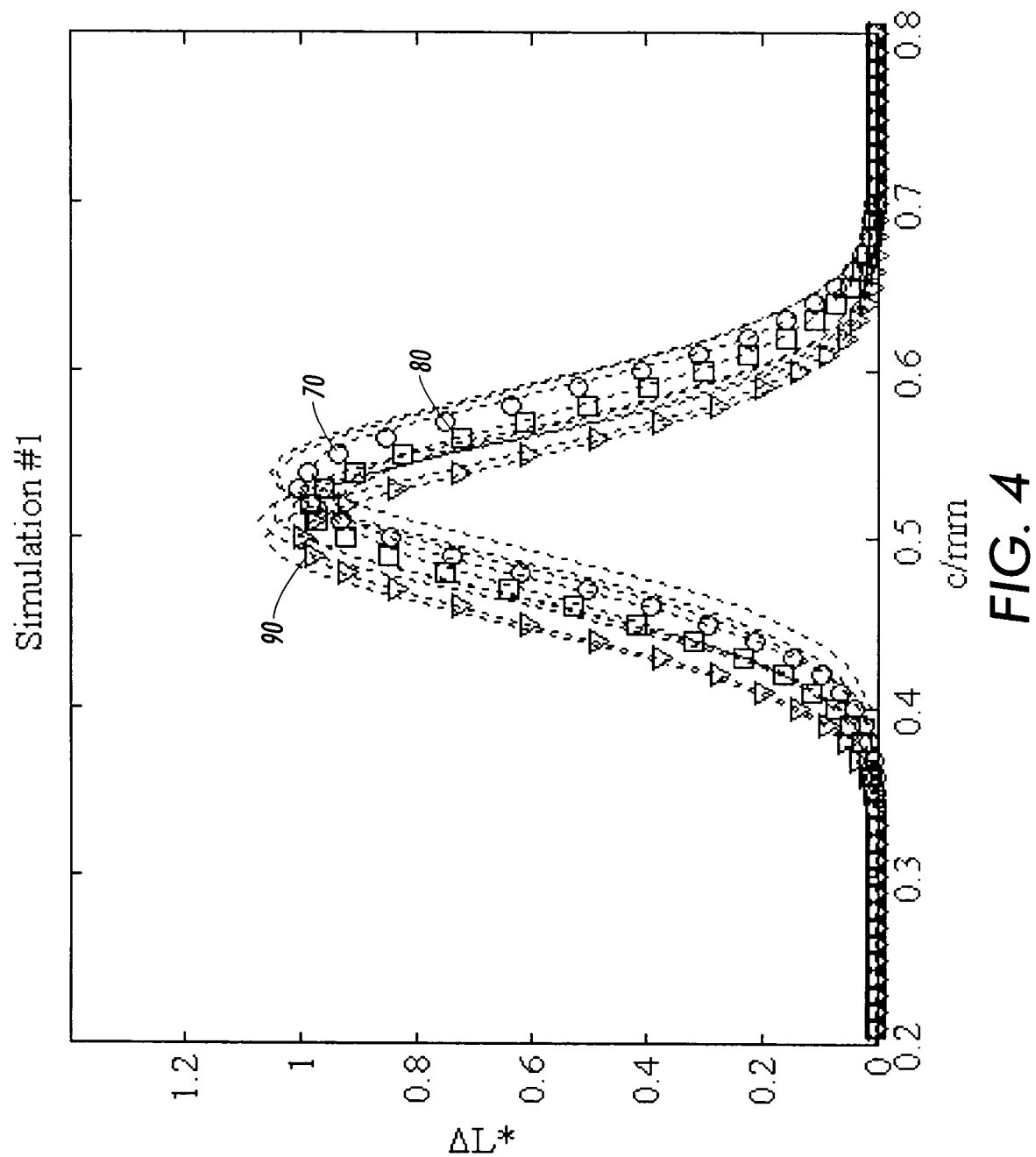
FIG. 4 is a graph showing results of a simulation wherein the reconstructed spectra are shown in tagged lines against a background of all of the isolated spectra produced from the image quality database shown in dotted lines.

The simulated characteristics are $(a, f, \sigma)=(1+n_{1t}, 0.5+n_{2t}, 0.05+n_{3t})$ over time. Here the $n_{it}$ terms are used to simulate any variation at time t. The results are shown in FIG. 4, where, the black dashed line curves are the ten isolated amplitude spectra R 16 reconstructed from noisy records 18, the circle tagged line 70 is the cumulative amplitude spectrum with prediction term T 22, the square tagged line 80 is the cumulative amplitude spectrum S 20 without prediction term, and the triangle tagged line 90 is the objective spectrum O if there is no noise in the banding defect records 18. It is not surprising that cumulative amplitude spectrum S 20 and cumulative amplitude spectrum with prediction term T 22 are slightly different due to the presence of the prediction term in T 22 and the presence of noise in the IQDB records 18 especially for $C_S=1$. But both the cumulative amplitude spectrum S 20 and the cumulative amplitude spectrum with prediction term T 22 are quite close to the objective spectrum O compared to many of the isolated amplitude spectra R 16.

In simulation #2, an IOT 106 with a single banding defect having a peak amplitude 1.0 L*, frequency 0.5 c/mm, and spread 0.05 c/mm is represented. In simulation #2, the peak amplitude varies randomly within 10% over time. The code implemented to simulate these parameters and generate the plot is as follows:

```
% -------------- simulation #2
% construct banding defect records from simulated IQDB
for i=1:numberOfRecord;
    BandingDefects(i).time = t(i);
    BandingDefects(i).amp = a0*(1+alpha*(2*rand(1)-1))+0.1*
    (2*rand(1)-1);
        %delta L* unit
    BandingDefects(i).freq = f0*(1+alpha*(2*rand(1)-1));     %c/mm
```

-continued

```
    BandingDefects(i).sigma = s0*(1+alpha*(2*rand(1)-1));   %c/mm
end
[T,S,R] = BandDetectionIQDB(T_current,f,lambda,BandingDefects,Cs);
figure;
plot(f,R,'k:');hold
plot(f,S,'ks',f,Rs,'kv',f,T,'ko','linewidth',1);
title('Simulation #2');
xlabel('c/mm');
ylabel('\DeltaL*')
axis([0.2 0.8 0 1.4])
```

Figure 5:
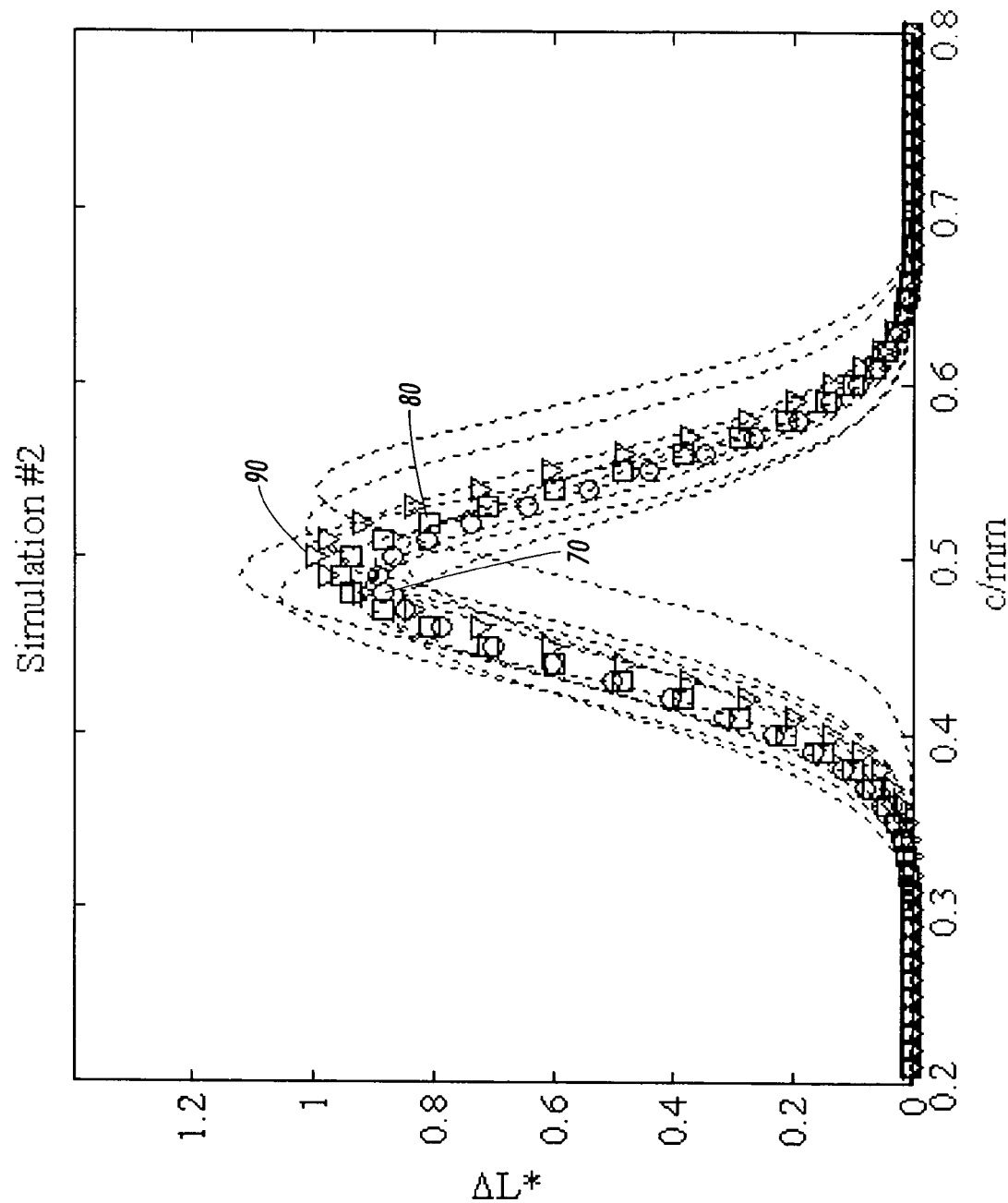
FIG. 5 is a graph similar to FIG. 4 of the results of a second simulation run with different parameters.

The simulated characteristics are (a, f, σ)=(1+0.1$n_{1t}$+$n_{2t}$, 0.5+$n_{3t}$,0.05+$n_{4t}$) over time. Here the $n_{it}$ terms are used to simulate any variation at time t. The results are shown in FIG. 5. As in FIG. 4, the black dashed line curves are the ten isolated amplitude spectra R 16 reconstructed from noisy records 18, the circle tagged line 70 is the cumulative amplitude spectrum with prediction term T 22, the square tagged line 80 is the cumulative amplitude spectrum S 20 without prediction term, and the triangle tagged line 90 is the objective spectrum O if there is no noise in the banding defect records 18. The advantage of using the cumulative amplitude spectrum S 20 without prediction term and the cumulative amplitude spectrum with prediction term T 22 to analyze the image quality performance rather than a single isolated spectrum R 16 is much more evident compared to simulation #1 when more noises is present in the measurement.

Figure 6:
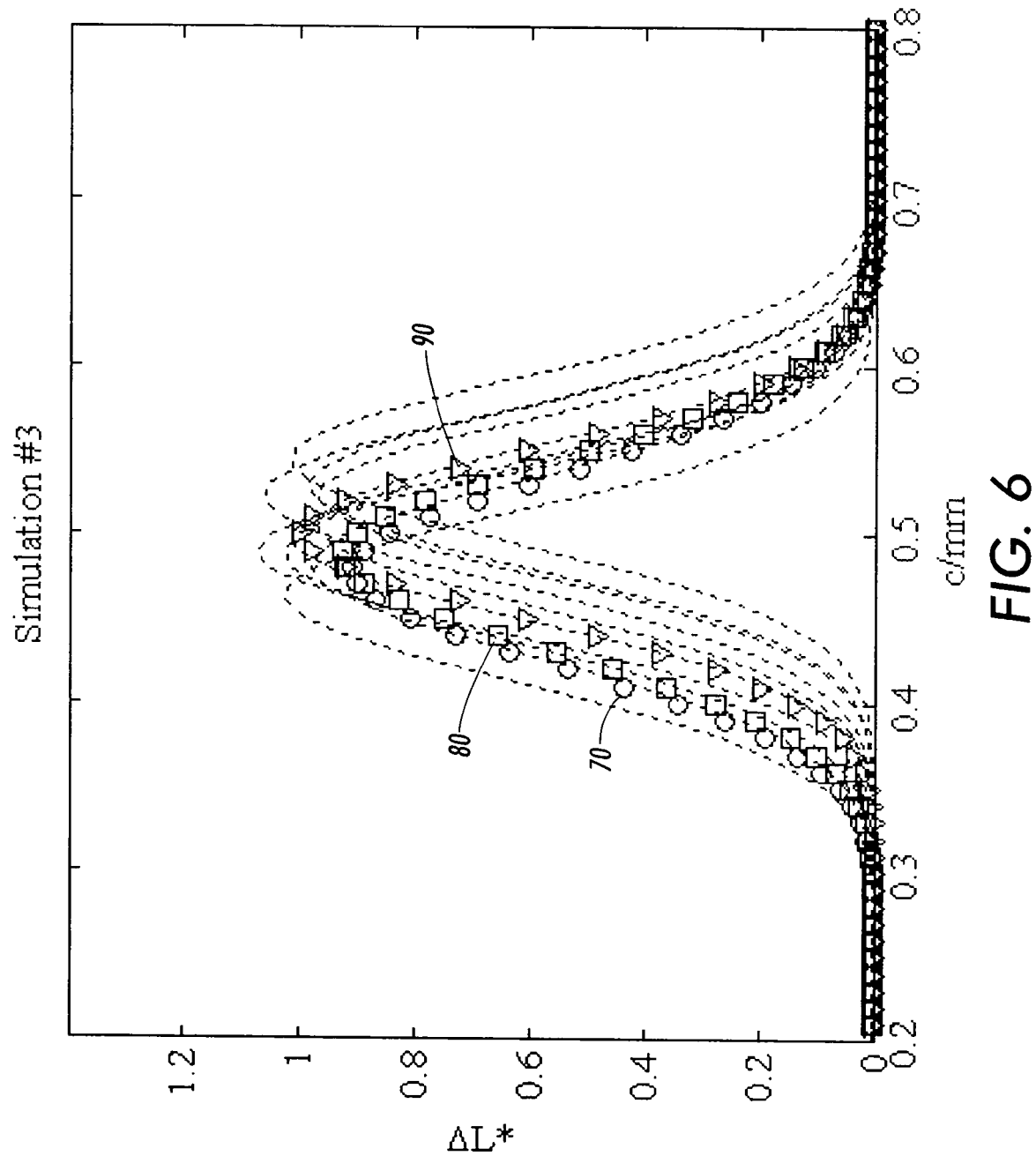
FIG. 6 is a graph similar to FIG. 4 of the results of a third simulation run with different parameters.

In simulation #3, an IOT 106 with a single banding of peak amplitude 1.0 L*, frequency 0.5 c/mm, and spread 0.05 c/mm is represented. In simulation #3, the peak frequency varies randomly within 10% over time. The code implemented to simulate these parameters and generate the plot is as follows:

The simulated characteristics are (a, f, σ)=(1+$n_{1t}$,0.5+0.05$n_{2t}$+$n_{3t}$,0.05+$n_{4t}$) over time. The results are shown in FIG. 6. As in FIGS. 4 and 5, the black dashed line curves are the ten isolated amplitude spectra R 16 reconstructed from noisy records 18, the circle tagged line 70 is the cumulative amplitude spectrum with prediction term T 22, the square tagged line 80 is the cumulative amplitude spectrum S 20 without prediction term, and the triangle tagged line 90 is the objective spectrum O if there is no noise in the banding defect records 18. The results are similar to the first two simulations except that the advantage of using the cumulative amplitude spectrum S 20 without prediction term and the cumulative amplitude spectrum with prediction term T 22 to analyze the image quality performance rather than a single isolated spectrum R 16 is much more evident compared to simulation #1 when there are more noises in the measurement. It should also be noted that the prediction term did improve the reconstruction this time. Thus, the cumulative amplitude spectrum with prediction term T 22 is closer than cumulative amplitude spectrum S 20 to the objective spectrum O. Also, FIG. 6 shows that the height of the cumulative amplitude spectrum S 20 is smaller than the objective spectrum O. This can be easily explained by the fact that the random shifts of banding frequency in the historical records blur the cumulative amplitude spectrum S 20. The blurring would get even worse if a pure averaging (equivalent to λ=1) were used instead of a probabilistic summation.

In simulation #4, an IOT 106 with a single banding of peak amplitude 1.0 L*, frequency 0.5 c/mm, and spread 0.05 c/mm is represented. In simulation #4, the peak frequency drifts over time. The code implemented to simulate these parameters and generate the plot is as follows:

```
% --------------- simulation #3
% construct banding defect records from simulated IQDB
% seed00 = sum(100*clock)
% rand('seed',seed00);
for i=1:numberOfRecord;
    BandingDefects(i).time = t(i);
    BandingDefects(i).amp = a0*(1+alpha*(2*rand(1)-1));          %delta L* unit
    BandingDefects(i).freq = f0*(1+alpha*(2*rand(1)-1))+0.05*(2*rand(1)-1);   %c/mm
    BandingDefects(i).sigma = s0*(1+alpha*(2*rand(1)-1)); %c/mm
end
[T,S,R] = BandDetectionIQDB(T_current,f,lambda,BandingDefects,Cs);
figure;
plot(f,R,'k:');hold
plot(f,S,'ks',f,Rs,'kv',f,T,'ko','linewidth',1);
title('Simulation #3');
xlabel('c/mm');
ylabel('\DeltaL*')
axis([0.2 0.8 0 1.4])
```

```
% --------------- simulation #4
% construct banding defect records from simulated IQDB
for i=1:numberOfRecord;
    BandingDefects(i).time = t(i);
    BandingDefects(i).amp = a0*(1+alpha*(2*rand(1)-1));          %delta L* unit
    BandingDefects(i).freq = f0*(1+alpha*(2*rand(1)-1))+0.001*t(i);   %c/mm
    BandingDefects(i).sigma = s0*(1+alpha*(2*rand(1)-1));   %c/mm
```

-continued

```
end
for lambda = [0.5 0.9 1];
    [T,S,R] = BandDetectionIQDB(T_current,f,lambda,BandingDefects,Cs);
    figure;
    plot(f,R,'k:');hold
  plot(f,S,'ks',f,T,'ko');
    title(['Simulation #4: \lambda=' num2str(lambda)]);
    xlabel('c/mm');
    ylabel('\DeltaL*')
  axis([0.2 0.8 0 1.4])
end
```

Figure 7:
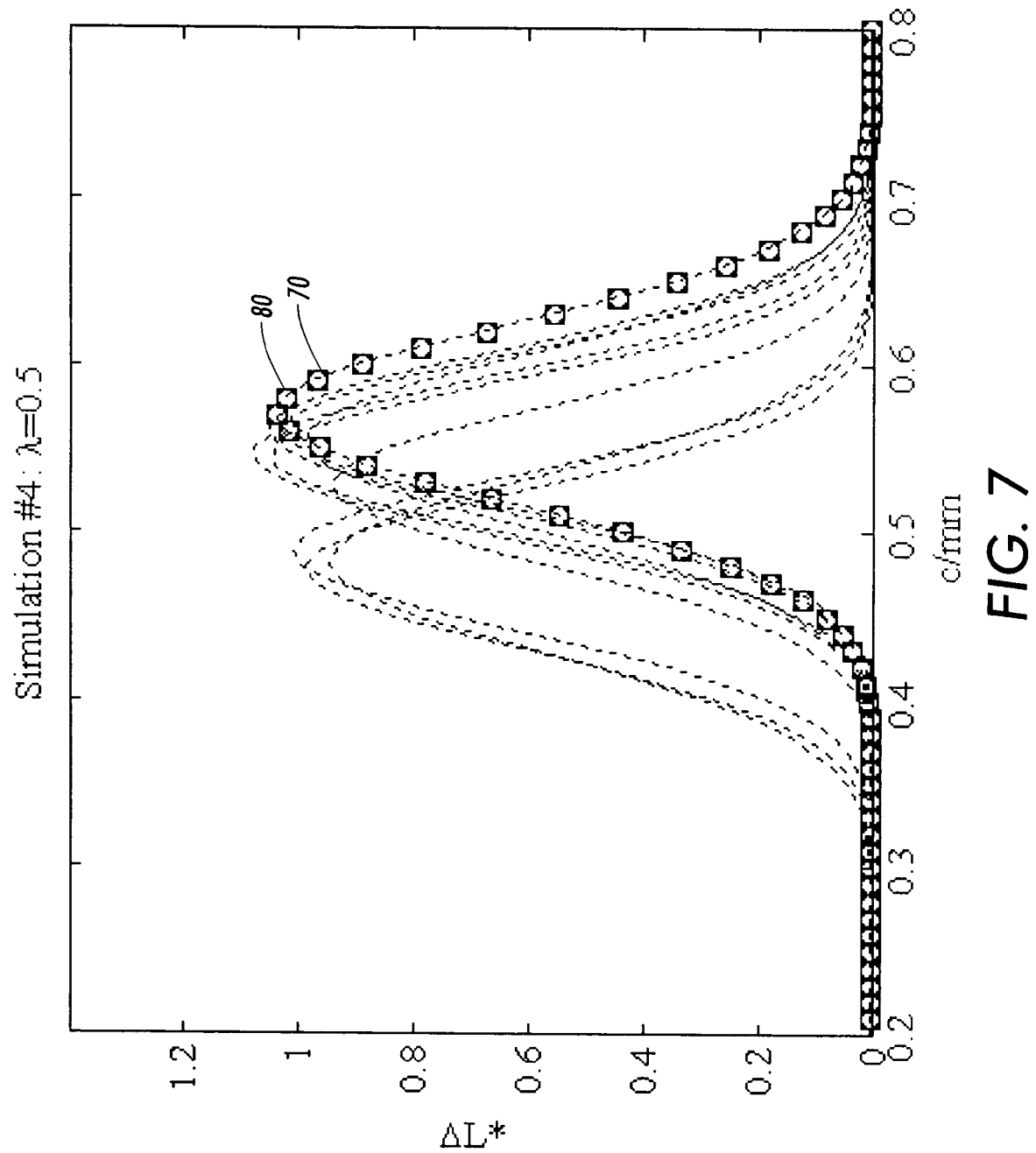
FIGS. 7-9 are graphs similar to FIG. 4 of the results of a fourth simulation run with different parameters showing the effects of modifying a prediction intensity parameter.
Figure 8:
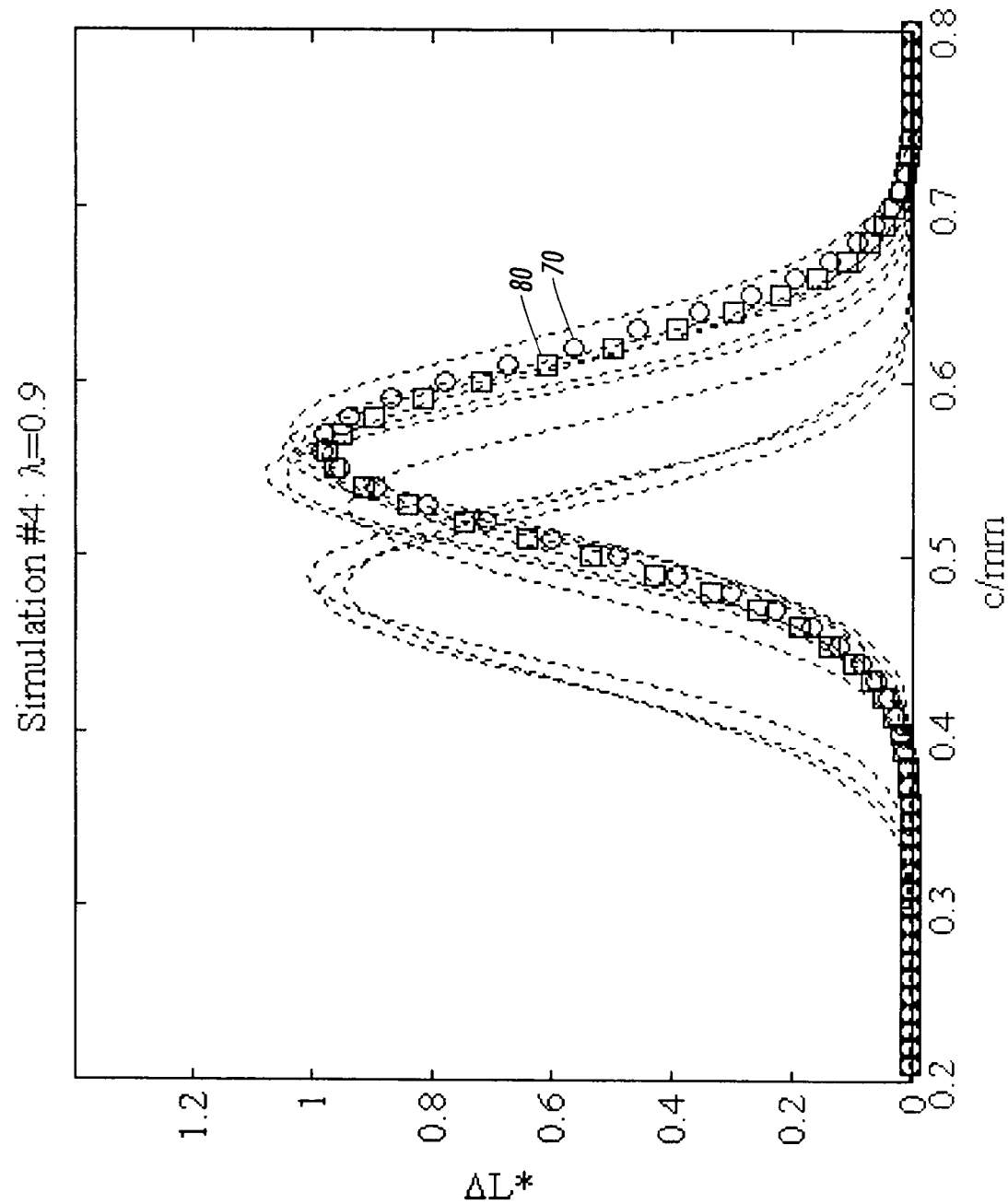
Figure 9:
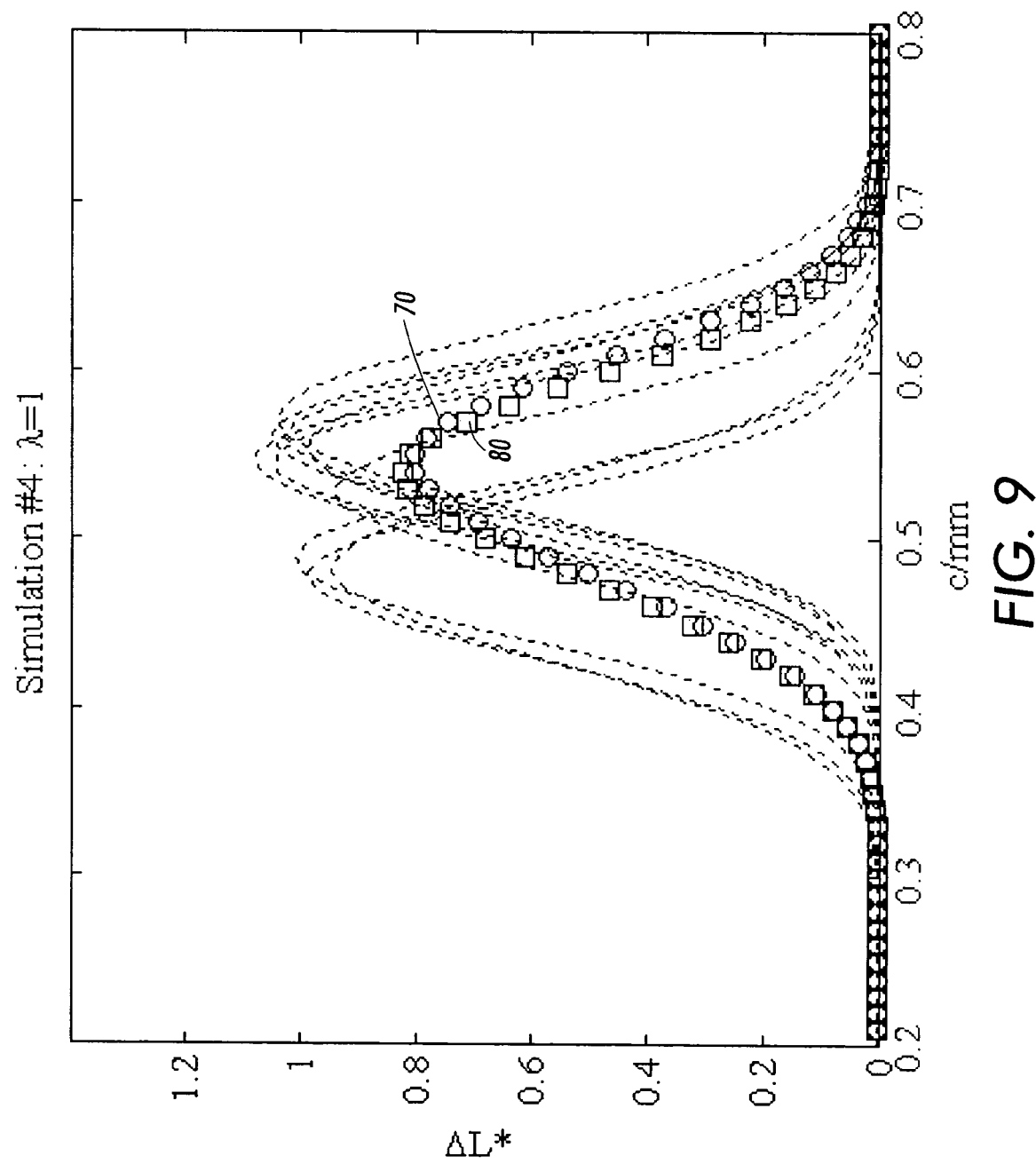
Figure 10:
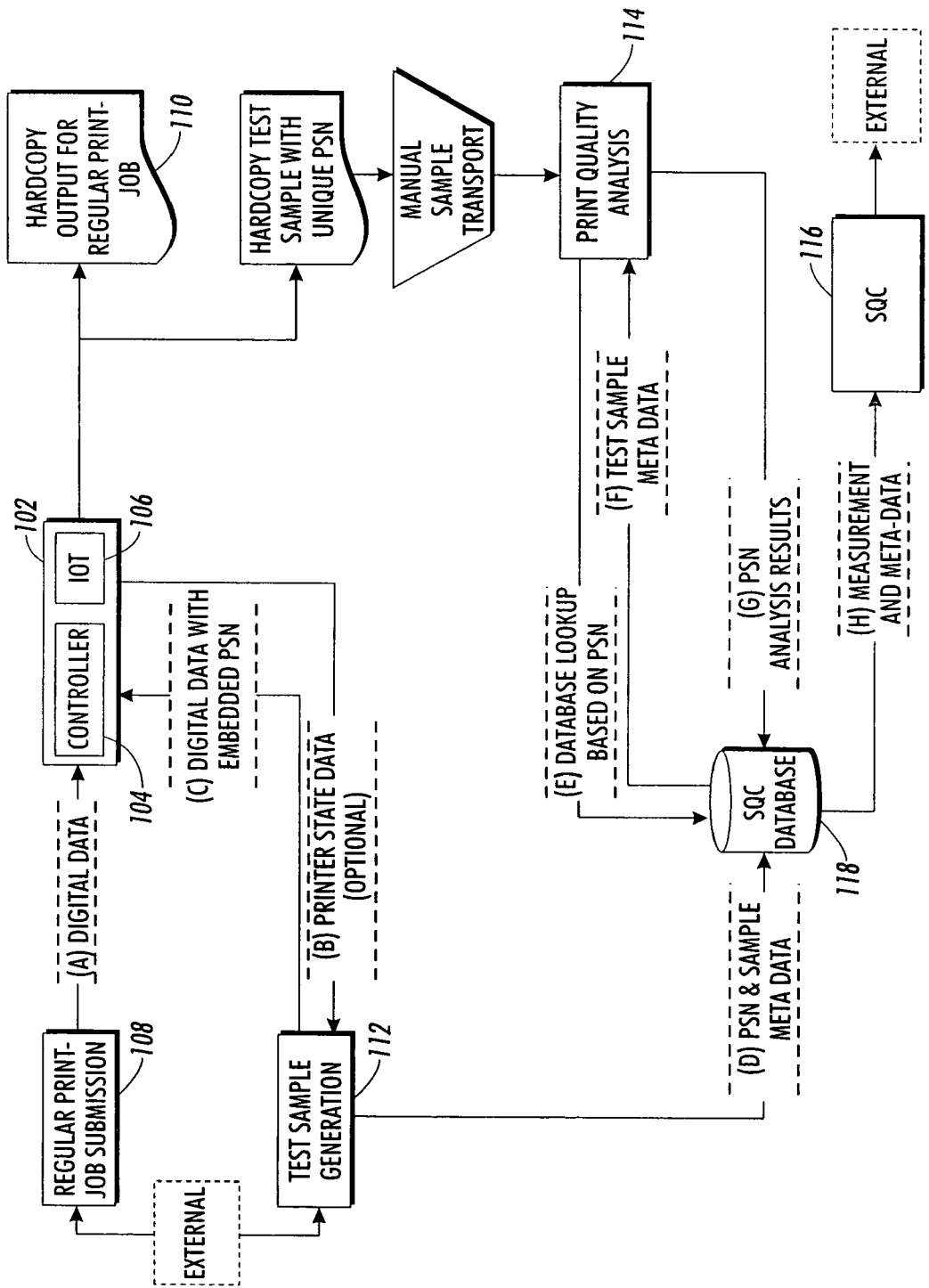
FIG. 10 is a diagrammatic view of a prior art device for detecting banding defects in the output of an image output device including an image quality database and an image quality engine.

The simulated characteristics are (a, f, $\sigma$)=(1+$n_{1t}$,0.5+ 0.001t+$n_{3t}$,0.05+$n_{4t}$) over time. Here the $n_{it}$ terms are used to simulate any variation at time t. Three separate runs were made in simulation #4 utilizing different values of $\lambda$. These runs of this simulation utilized $\lambda$=0.5, $\lambda$=0.9 and $\lambda$=1.0, respectively, to show how the inferred data will track this simulated frequency drift as the value of $\lambda$ changes. The results of the first run ($\lambda$=0.5) are shown in FIG. 7, the results of the second run ($\lambda$=0.9) are shown in FIG. 8 and the results of the third run ($\lambda$=1.0) are shown in FIG. 9. In FIGS. 7-9, the black dashed line curves are the ten isolated amplitude spectra R 16 reconstructed from noisy records 18, the circle tagged line 70 is the cumulative amplitude spectrum with prediction term T 22 and the square tagged line 80 is the cumulative amplitude spectrum S 20 without prediction term. There is no objective spectrum O in this simulation since the simulated frequency was drifting to the right over time. Comparing the results of the three separate runs shows the effect of choosing $\lambda$ values on the short-term/long-term conclusion. If short-term trends are to be observed, the conclusion should be as close to the last data record (right-most due to the intended frequency shift). Values of $\lambda$=0.5 and $\lambda$=0.9 give that result, while a $\lambda$ value of 1.0 does not. If long-term trend is to be observed, the conclusion should be close to the mid point of frequency spread (~0.52 c/mm). Value $\lambda$=1.0 gives that result while $\lambda$ values 0.5 and 0.9 do not.

Even though the assumption was made that there is only one banding defect in each simulated record 18 for simplicity, these simulations give a rough idea how the algorithm will behave for different value of $C_S$ and $\lambda$. $C_S$ and $\lambda$ are the only parameters in the algorithm that the users need to adjust for their application.

While the disclosed device and method has been described with reference to banding defects, the same concept can be applied within the scope of the disclosure to other image quality defects, including, but not limited to streaks. Banding defects are periodic 1-D image quality defects that are best recorded in the Spectral domain (a, f, $\sigma$) as described above. Streaks are non-periodic defects that are best described in the spatial domain by a profile (a, L, w, $\sigma$) where a is the amplitude, L is the location of the streak and, w is the width of the streak and $\sigma$ is again confidence of the measurement of location, width, and amplitude.

Although the invention has been described in detail with reference to a certain embodiment, variations and modifications exist within the scope and spirit of the present invention as described and defined in the following claims.

What is claimed is:

1. A method of detecting banding defects in the output of an image output device comprising the steps of:
   generating a test pattern at a known time;
   analyzing the test pattern to generate spectral banding defect records;
   storing the spectral banding defect records in memory linked to a time stamp indicating known time when the test pattern was generated;
   repeating the generating, analyzing and storing steps at a plurality of different known times to generate a database of time stamped spectral banding defect records;
   reconstructing an isolated spectrum from each spectral banding defect record in the database;
   constructing a cumulative spectrum by probabilistic summation of isolated spectra;
   analyzing the cumulative spectrum using an image quality assessment/analysis engine.

2. The method of claim 1 wherein the analyzing step includes generating raw image quality data and applying spectral analysis to the raw image data to generate the spectral banding defect records.

3. The method of claim 1, wherein the banding defect records include the one dimensional amplitude, frequency and spread of each detected banding defect in the test pattern.

4. The method of claim 3 wherein the raw image quality data is discarded after the spectral banding defect records are generated so that the raw image data is not stored in memory after the spectral banding defect records have been stored in memory.

5. The method of claim 3 wherein the cumulative spectrum includes a prediction term to simulate future image quality performance.

6. The method of claim 1 wherein the constructing a cumulative spectrum step includes applying a membership function to each of the reconstructed isolated spectra.

7. The method of claim 6, wherein analyzing the test pattern to generate spectral banding defect records step includes utilizing selected spectral analysis techniques and the reconstructing an isolated spectrum step includes selecting the membership function based on the selected spectral analysis technique utilized in the analyzing the test pattern to generate spectral banding defect records step.

8. The method of claim 6 wherein the membership function is selected from the group of the uniform distribution function and the normal distribution function.

9. The method of claim 6, wherein analyzing the test pattern to generate spectral banding defect records step includes utilizing selected spectral analysis techniques and the reconstructing an isolated spectrum step includes selecting the membership function based on the selected spectral analysis technique utilized in the analyzing the test pattern to generate spectral banding defect records step.

10. The method of claim 1 wherein the constructing a cumulative spectrum step includes the step of weighting each of the reconstructed isolated spectrum according to the time stamp linked to the spectral banding defect record from which the isolated spectrum was reconstructed.

11. The method of claim 1 and further comprising the steps of storing the cumulative spectrum constructed, generating a test pattern at a known time after the storing the cumulative spectrum step, analyzing the generated test pattern to generate spectral banding defect records, storing the generated spectral banding defect records in memory linked to a time stamp indicating known time when the test pattern was generated and constructing a cumulative spectrum by recursively updating the stored cumulative spectrum utilizing the generated spectral banding defect records.

12. The method of claim 1 wherein the constructing the cumulative spectrum step includes by probabilistic summation of all of the isolated spectra reconstructed.

13. A method of detecting image quality defects in the output of an image output device comprising the steps of:
generating a test pattern at a known time;
analyzing the test pattern to generate image quality defect records;
storing the image quality defect records in memory linked to a time stamp indicating known time when the test pattern was generated;
repeating the generating, analyzing and storing steps at a plurality of different known times to generate a database of time stamped image quality defect records;
reconstructing isolated defect data from each of a plurality of image quality defect records in the database;
constructing cumulative defect data by probabilistic summation of the isolated defect data;
analyzing the cumulative defect data using an image quality assessment/analysis engine.

14. The method of claim 13, wherein isolated defect data is reconstructed from each of the image quality records in the database and the cumulative defect data is constructed by probabilistic summation of all of the reconstructed isolated defect data.

15. The method of claim 13, wherein the constructing cumulative defect data step includes the step of weighting each of the reconstructed isolated defect data according to the time stamp linked to the image quality defect record from which the isolated defect data was reconstructed.

16. The method of claim 15, wherein the test pattern is analyzed for streaking defects.

17. The method of claim 15, wherein the test pattern is analyzed for banding defects.

18. The method of claim 13 and further comprising the steps of storing the cumulative defect data constructed, generating a test pattern at a known time after the storing the cumulative defect data step, analyzing the generated test pattern to generate image quality defect records, storing the generated image quality defect records in memory linked to a time stamp indicating known time when the test pattern was generated and constructing cumulative defect data by recursively updating the stored cumulative defect data utilizing the generated image quality defect records.

19. The method of claim 18, wherein the test pattern is analyzed for streaking defects.

20. The method of claim 18, wherein the test pattern is analyzed for banding defects.

* * * * *